United States Patent
Yiu et al.

(10) Patent No.: US 10,390,261 B2
(45) Date of Patent: Aug. 20, 2019

(54) LOAD BALANCING SCHEMES FOR IDLE MODE USER EQUIPMENT

(71) Applicant: Intel IP Corporation, Santa Clara, CA (US)

(72) Inventors: Candy Yiu, Portland, OR (US); Youn Hyoung Heo, San Jose, CA (US); Mo-Han Fong, Sunnyvale, CA (US); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 2 days.

(21) Appl. No.: 15/631,947

(22) Filed: Jun. 23, 2017

(65) Prior Publication Data
US 2017/0289849 A1 Oct. 5, 2017

Related U.S. Application Data

(63) Continuation of application No. 14/669,662, filed on Mar. 26, 2015, now Pat. No. 9,693,278.
(Continued)

(51) Int. Cl.
*G06F 11/00* (2006.01)
*H04W 28/08* (2009.01)
(Continued)

(52) U.S. Cl.
CPC .......... *H04W 28/08* (2013.01); *H04W 36/06* (2013.01); *H04W 36/22* (2013.01); *H04W 36/26* (2013.01);
(Continued)

(58) Field of Classification Search
CPC ..... H04W 28/08; H04W 36/22; H04W 36/06; H04W 48/16; H04W 36/26; H04W 72/0453; H04W 36/24; H04W 48/20
(Continued)

(56) References Cited

U.S. PATENT DOCUMENTS 9,301,221 B2 * 3/2016 Lee ................. H04W 36/06
9,693,278 B2   6/2017 Yiu et al.
(Continued)

FOREIGN PATENT DOCUMENTS

EP  2892281 A1  7/2015
JP  2009141945 A  6/2009
(Continued)

OTHER PUBLICATIONS

"Japanese Application Serial No. 2017-124861, Office Action dated May 15, 2018", W/ English Translation, 4 pgs.
(Continued)

*Primary Examiner* — Chuong T Ho

(74) *Attorney, Agent, or Firm* — Schwegman Lundberg & Woessner, P.A.

(57) ABSTRACT

A user equipment device (UE) comprises physical layer circuitry configured to transmit and receive radio frequency electrical signals with one or more nodes of a radio access network; and processing circuitry. The processing circuitry is configured to receive system information via the network, wherein the system information indicates cell specific priority and frequency priority; identify candidate cells that have a cell specific priority that is higher than a cell priority of the current serving cell, have a frequency priority that is higher than a frequency priority of a current serving frequency, and satisfy a cell suitability criterion; and determine a candidate cell from the identified candidate cells to replace the current serving cell for communicating with the network.

15 Claims, 5 Drawing Sheets

Related U.S. Application Data

(60) Provisional application No. 62/035,924, filed on Aug. 11, 2014.

(51) Int. Cl.

| | |
|---|---|
| *H04W 36/26* | (2009.01) |
| *H04W 48/16* | (2009.01) |
| *H04W 36/06* | (2009.01) |
| *H04W 36/22* | (2009.01) |
| *H04L 12/28* | (2006.01) |
| *H04W 48/20* | (2009.01) |
| *H04W 36/24* | (2009.01) |
| *H04W 72/04* | (2009.01) |

(52) U.S. Cl.
CPC ............ *H04W 48/16* (2013.01); *H04W 36/24* (2013.01); *H04W 48/20* (2013.01); *H04W 72/0453* (2013.01)

(58) Field of Classification Search
USPC .............................. 370/252, 254, 253, 235
See application file for complete search history.

(56) References Cited

U.S. PATENT DOCUMENTS

| | | | |
|---|---|---|---|
| 2005/0288017 A1* | 12/2005 | Doumenc | H04W 36/0083 455/435.3 |
| 2008/0220784 A1 | 9/2008 | Somasundaram et al. | |
| 2009/0181676 A1 | 7/2009 | Lee et al. | |
| 2010/0216469 A1 | 8/2010 | Yi et al. | |
| 2011/0250891 A1 | 10/2011 | Zou et al. | |
| 2012/0003974 A1 | 1/2012 | Nylander et al. | |
| 2012/0250578 A1* | 10/2012 | Pani | H04W 48/12 370/254 |
| 2013/0142104 A1 | 6/2013 | Lee et al. | |
| 2013/0176885 A1 | 7/2013 | Lee et al. | |
| 2013/0303165 A1 | 11/2013 | Hole | |
| 2013/0303173 A1 | 11/2013 | Hole et al. | |
| 2013/0303174 A1 | 11/2013 | Hole et al. | |
| 2014/0011500 A1 | 1/2014 | Jokinen et al. | |
| 2014/0071939 A1 | 3/2014 | Yang et al. | |
| 2014/0128074 A1* | 5/2014 | Vangala | H04W 36/22 455/436 |
| 2015/0057002 A1* | 2/2015 | Lee | H04W 36/06 455/437 |
| 2016/0044539 A1 | 2/2016 | Yiu et al. | |
| 2017/0289849 A1* | 10/2017 | Yiu | H04W 36/26 |
| 2018/0352508 A1* | 12/2018 | Fujishiro | H04W 36/06 |

FOREIGN PATENT DOCUMENTS

| | | |
|---|---|---|
| JP | 2010527183 A | 8/2010 |
| JP | 2013138448 A | 7/2013 |
| JP | 2014027680 A | 2/2014 |
| JP | 6386161 B2 | 8/2018 |
| WO | WO-0143462 A2 | 6/2001 |
| WO | WO-2011004828 A1 | 1/2011 |
| WO | WO-2012171503 A1 | 12/2012 |
| WO | WO-2014014859 A1 | 1/2014 |
| WO | WO-2014034089 A1 | 3/2014 |
| WO | WO-2016025078 A1 | 2/2016 |

OTHER PUBLICATIONS

"Japanese Application Serial No. 2017-506846, Response filed Apr. 5, 2018 to Office Action dated Jan. 23, 2018", (W/ English Claims), 21 pgs.

U.S. Appl. No. 14/669,662 U.S. Pat. No. 9,693,278, filed Mar. 26, 2015, Load Balancing Schemes for Idle Mode User Equipment.
"U.S. Appl. No. 14/669,662, Corrected Notice of Allowance dated May 26, 2017", 4 pgs.
"U.S. Appl. No. 14/669,662, Final Office Action dated Dec. 1, 2016", 17 pgs.
"U.S. Appl. No. 14/669,662, Non Final Office Action dated Jun. 30, 2016", 12 pgs.
"U.S. Appl. No. 14/669,662, Notice of Allowance dated Feb. 23, 2017", 10 pgs.
"U.S. Appl. No. 14/669,662, Response filed Feb. 1, 2017 to Final Office Action dated Dec. 1, 2016", 10 pgs.
"U.S. Appl. No. 14/669,662, Response filed Sep. 6, 2016 to Non Final Office Action dated Jun. 30, 2016", 11 pgs.
"International Application Serial No. PCT/US2015/036687, International Preliminary Report on Patentability dated Feb. 23, 2017", 10 pgs.
"International Application Serial No. PCT/US2015/036687, International Search Report dated Sep. 30, 2015", 4 pgs.
"International Application Serial No. PCT/US2015/036687, Written Opinion dated Sep. 30, 2015", 8 pgs.
"European Application Serial No. 15831948.3, Communication Pursuant to Article 94(3) EPC mailed Dec. 18, 2018", 7 pgs.
"European Application No. 15831948.3, Response filed Aug. 24, 2018 to Extended European Search Report dated Feb. 13, 2018", 23 pgs.
"Japanese Application Serial No. 2017-124861, Examiners Decision of Final Refusal dated Sep. 18, 2018", W/ English Translation, 6 pgs.
"Japanese Application Serial No. 2017-124861, Response Filed Aug. 8, 2018 to Office Action dated May 15, 2018", W/ English Claims, 15 pgs.
"3rd Generation Partnership Project; Technical Specification Group Radio Access Network; Evolved Universal Terrestrial Radio Access(E-UTRA); User Equipment(UE) procedures in idle mode (Release 12)", 3GPP TS 36.304 V12.1.0, (Jun. 2014), 35 pgs.
"Cell-specific prioritization for idle mode load balancing", Ericsson, Verizon,3GPP TSG-RAN WG2#86 R2-142530, [Online] Retrieved from the Internet : <http://www.3gpp.org/ftp/tsg_ran/WG2_RL2/TSGR2_86/Docs/R2-142530.zip>, (May 23, 2014), 6 pgs.
"European Application Serial No. 15831948.3, Extended European Search Report dated Feb. 13, 2018", 11 pgs.
"Hash algorithm based idle UE distribution", ZTE Corporation: 3GPP Draft; R2-143113—Hash Algorithm Based Idle UE Distribution, 3rd Generation Partnership PrOject (3GPP), Mobile COmpetence Centre ; 650, Route Des Lucioles ; F-06921 S0phia-Antip0lis Cedex ; France, (Aug. 8, 2014), 6 pgs.
"Hash algorithm based idle UE distribution", ZTE, 3GPP TSG-RAN WG2#86 R2-142000, [Online] Retrieved from the Internet : <http://www.3gpp.org/ftp/tsg_ran/WG2_RL2/TSGR2_86/Docs/R2-142000.zip>, (May 23, 2014), 6 pgs.
"Idle UE Distribution in Macro Only System and HetNets", Alcatel-Lucent, Verizon, 3GPP TSG-RAN WG2?86 R2-142495, [Online] Retrieved from the Internet : <http://www.3gpp.org/ftp/tsg_ran/WG2_RL2/TSGR2_86/Docs/R2-142495.zip>, (May 23, 2014), 6 pgs.
"Japanese Application Serial No. 2017-506846, Office Action dated Jan. 23, 2018", w/English Translation, 12 pgs.
"Way forward for load-balancing idle mode Ues", Intel Corporation, 3GPP TSG-RAN WG2#87 R2-143257, [Online] Retrieved from the Internet : <URL:http://www.3gpp.org/ftp/tsg_ran/WG2_RL2/TSGR2_87/Docs/R2-143257.zip>, (Aug. 9, 2014), 6 pgs.

\* cited by examiner

LOAD BALANCING SCHEMES FOR IDLE MODE USER EQUIPMENT

PRIORITY APPLICATION

This application is a continuation of U.S. application Ser. No. 14/669,662, filed Mar. 26, 2015, which claims the benefit of priority to U.S. Provisional Application Ser. No. 62/035,924, filed Aug. 11, 2014, all of which are incorporated herein by reference in their entirety.

TECHNICAL FIELD

Embodiments pertain to transmitting voice data using radio access networks. Some embodiments relate to mobile cellular telephone communication networks.

BACKGROUND

Radio access networks can be used for delivering voice communications to user equipment such as a mobile cellular telephone or a smart phone. A cellular telephone network includes fixed location transceivers distributed land areas. Cell transceivers of the network may be included in cell towers to serve large land areas and cell transceivers may be arranged to serve smaller areas or to provide localized service such as within a building. The transceivers and the areas that they serve can be referred to as cells of the cellular network. The network traffic or load experienced by a cell depends on the number of UEs that request access to the cell and the demand for cell bandwidth by the UEs. When a cell experiences a high amount of traffic, a LIE may experience delay or latency in communications or delay in accessing network service. It is desirable to balance the load of the cells of the network to maximize service to UEs. Thus, there are general needs for devices, systems and methods that provide a robust protocol for communication with UEs and yet minimize delay or interruption in end-to-end voice communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
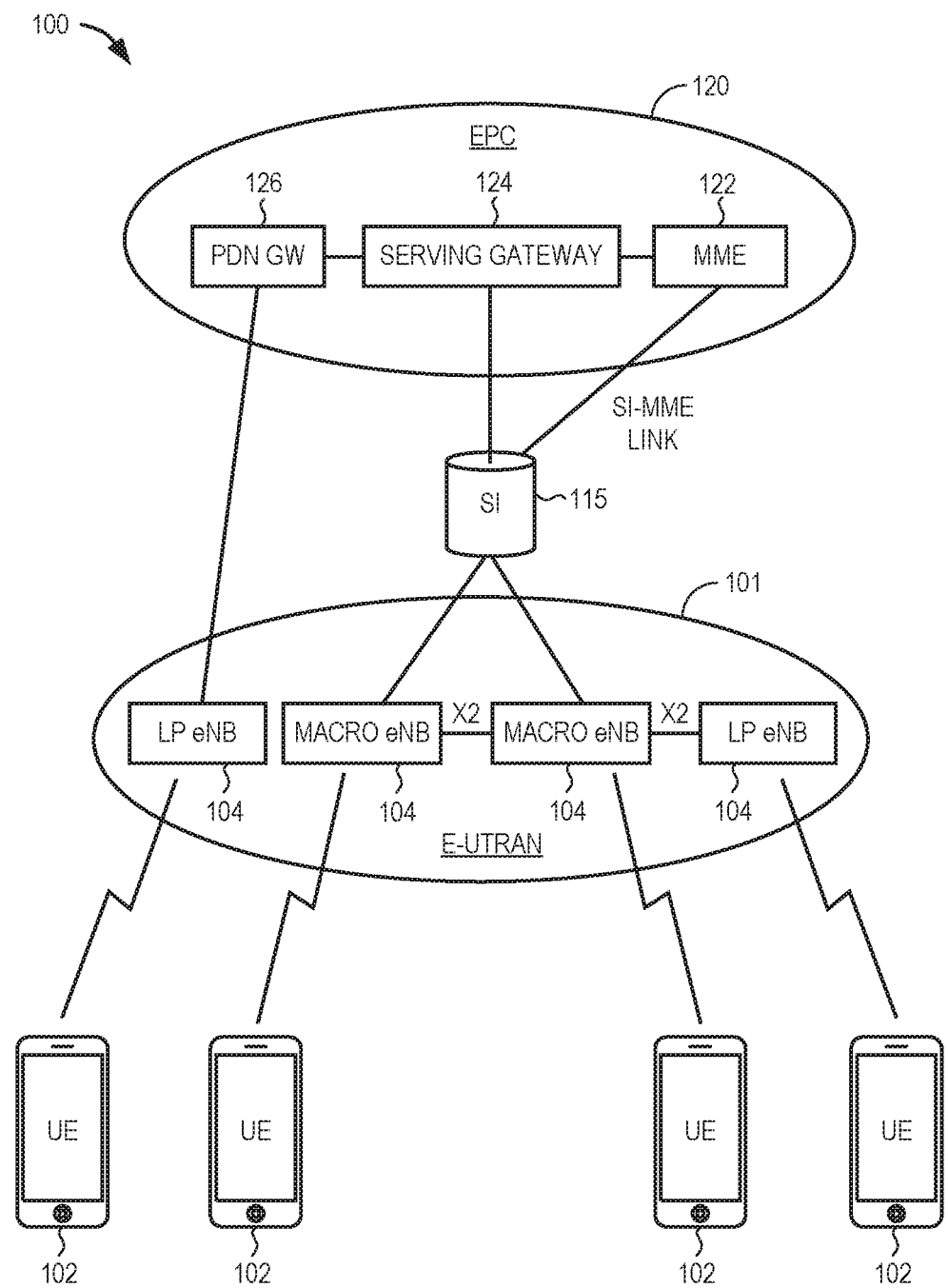
FIG. 1 shows an example of a portion of an end-to-end network architecture of a long term evolution (LTE) network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the evolved universal terrestrial radio access network or E-UTRAN) 101 and the core network 120 (e.g., shown as an evolved packet core (EPC)) coupled together through an S1 interface 115. For convenience and brevity, only a portion of the core network 120, as well as the RAN 100, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (LMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U the user plane interface between the eNBs 104.

With cellular networks, small cells may be low power cells used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Figure 2:
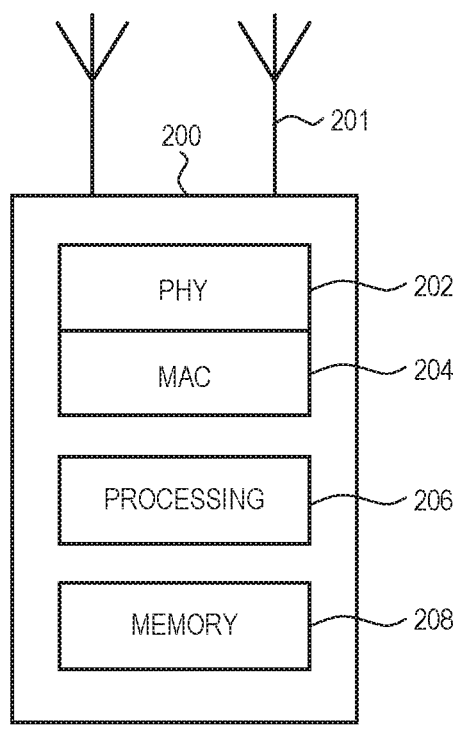
FIG. 2 illustrates a functional block diagram of a UE in accordance with some embodiments.

FIG. 2 illustrates a functional block diagram of a UE in accordance with some embodiments. The UE 200 may be suitable for use as any one or more of the UEs 102 illustrated in FIG. L The UE 200 may include physical layer (PHY) circuitry 202 for transmitting and receiving radio frequency electrical signals to and from one or more nodes of a radio access network such as eNBs 104 (FIG. 1) using one or more antennas 201 electrically coupled to the PHY circuitry 202. The PHY circuitry 202 may include circuitry for modulation/demodulation, upconversion/downconversion, filtering, amplification, etc. UE 200 may also include medium access control layer (MAC) circuitry 604 for controlling access to the wireless medium and to configure frames or packets for communicating over the wireless medium. UE 200 may also include processing circuitry 206 and memory 208 arranged to configure the various elements of the UE to perform the operations described herein. The memory 208 may be used to store information for configuring the processing circuitry 206 to perform the operations.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the LIE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

When in an idle mode, UE 200 may have no current connection and may try to find and maintain service to the network 100 by finding a suitable cell. The UE scans frequency bands supported by the eNBs to find a cell suitable to transfer data such as packetized voice data. To move from idle mode to a connection mode, the UE 200 identifies a suitable cell according to a suitability criterion that may include, among other things, a received signal power. The eNBs communicate the priority of frequencies for scanning by UEs. A UE may reselect to a frequency of higher priority or a frequency of lower frequency priority according to the suitability criterion.

As explained previously, UEs may experience delay or latency in communications or delay in accessing network service when a cell experiences a high amount of traffic. It is desirable to balance the load of the cells of the network to maximize service of UEs. Frequency priority may provide some network balancing, but the inventors have recognized that frequency priority alone may involve drawbacks in network load balancing.

Figure 3:
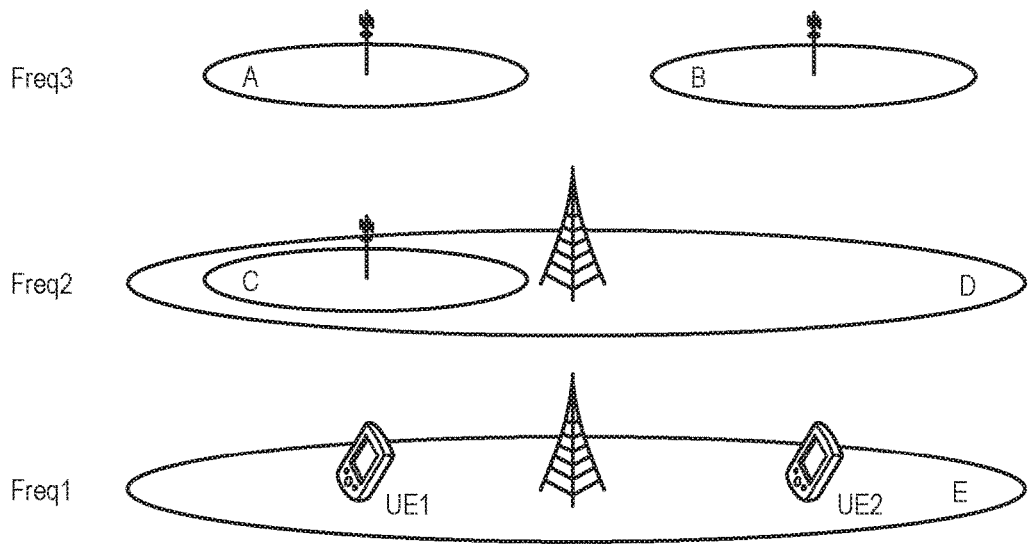
FIG. 3 illustrates portions of an example of network communication traffic loading a cellular phone network.

FIG. 3 illustrates an example of uneven network traffic loading a cellular phone network, such as an LTE network. The cellular phone network or cell network includes multiple carrier frequencies deployed using small cells labeled A, B, and C, and macro cells D and E. The macro cells may be macro eNBs and the small cells may be micro eNBs or LP eNBs. The example also shows UEs labeled UE1 and UE2 located in different areas of macro cell E.

As shown in the example of FIG. 3, macro cell E is assigned carrier Frequency 1, macro cell D and small cell C are assigned carrier Frequency 2, and small cell A and small cell B are assigned carrier Frequency 3. Assume that the macro cells D and E as well as small cell A are overloaded with network communication traffic, and that small cells C and B are under-loaded. The preferred solution is to balance the communication traffic to the under-loaded cells. However, prioritizing frequency alone does not always lead to the best load balancing solution.

For instance, frequency prioritization in the example of FIG. 3 may involve setting the priority of carrier Frequency 2 to be higher than carrier Frequency 1. Because macro cell E is overloaded, UE1 will reselect to small cell C because of its location and the frequency priority, and UE2 will reselect macro cell D. While UE1 was redirected to a less busy cell, UE2 still experiences high traffic, and the balancing solution is not optimal. If frequency prioritization involves setting the priority of carrier Frequency 3 to be higher than carrier Frequency 1, UE1 will reselect to small cell A and UE2 will reselect to small cell B. In this scenario, UE2 is redirected to a less busy cell while UE1 still experiences high traffic, and again the solution provided with frequency prioritization only is not optimal.

Figure 4:
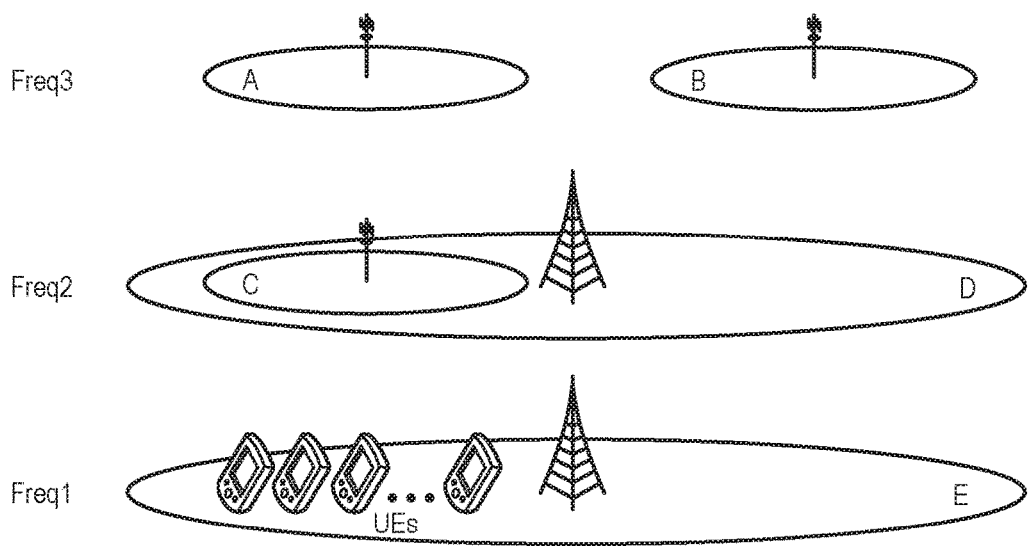
FIG. 4 illustrates portions of another example of network communication traffic loading a cellular phone network.

FIG. 4 illustrates portions of another example of uneven network traffic loading a cell network. In the example, many UEs are shown located in the same area of macro cell E. This may happen at an event like a football game or concert. Assume that neither of small cell A or small cell C are overloaded and may be under-loaded. At the conclusion of the event, many users will try to place calls to friends and family. As many of the UEs try to change from idle mode to connection mode, macro cell E can become overloaded in network traffic. For a frequency-only priority scheme, the UEs will try to camp on the same frequency according to the priority and overload the same cell, whether it is small cell A or small cell C. A more optimal solution would be to uniformly distribute UE traffic among all the co-located cells A, C, and E.

Figure 5:
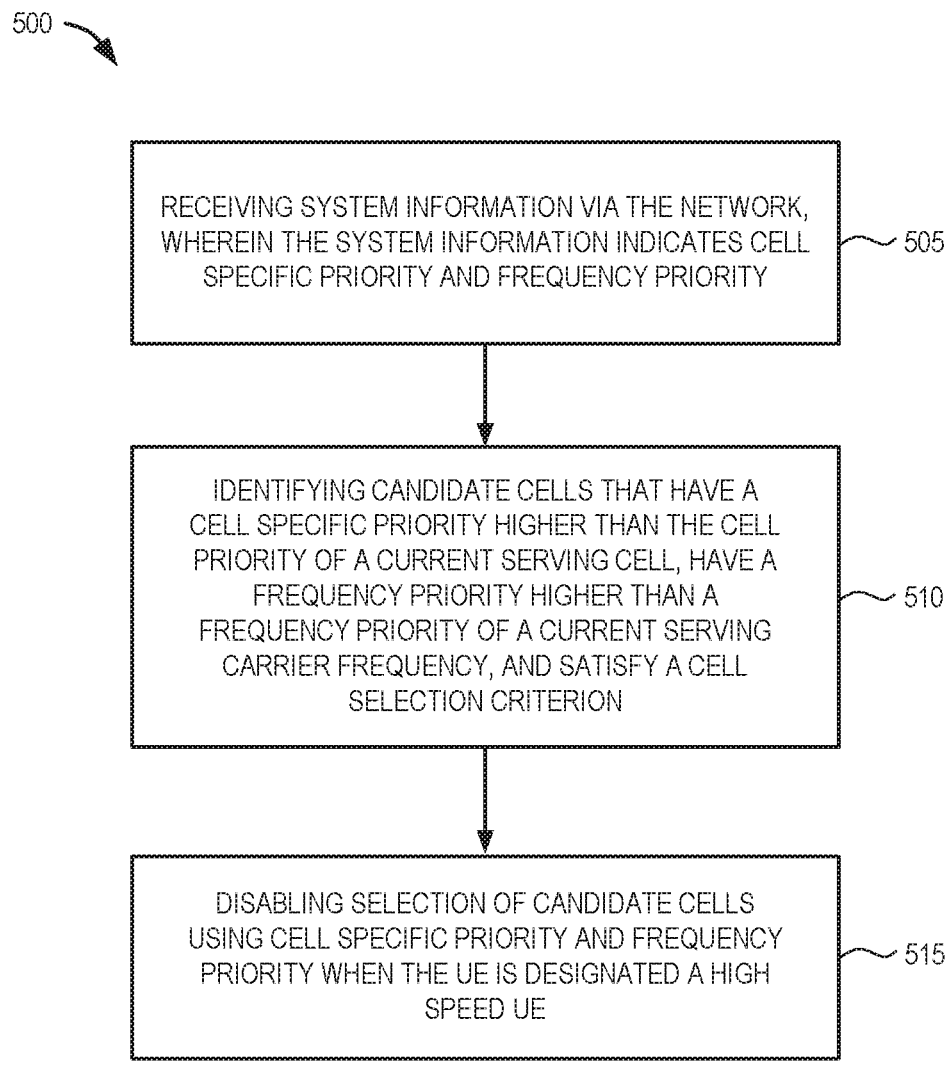
FIG. 5 shows a flow diagram of an example of a method of balancing network communication traffic in an end-to-end communication network in accordance with some embodiments.

FIG. 5 shows a flow diagram of an example of a method 500 of balancing network traffic of an end-to-end communication network. To balance the network traffic, cell specific priority selection is added to the frequency priority selection. At 505, system information is received by the UE via the network. The system information indicates the cell specific priority and carrier frequency priority. This system information can be sent from an eNB, such as by a system information broadcast (SIB) for example. In some embodiments, if a cell specific priority is assigned a higher priority than the current serving carrier frequency priority, a UE will reselect to the higher priority cell. The cell specific priority adds another layer of control by allowing the network to prioritize cells as well as carrier frequencies. In some embodiments, cell specific priority is determined according to cell location. For instance, more closely located cells may be assigned higher priority than cells located farther away.

At 510, the processing circuitry of the UE identifies candidate cells to replace the current serving cell. The candidate cells have a cell specific priority that is higher than the cell priority of the current serving cell, and have a frequency priority that is higher than the frequency priority of the current serving carrier frequency. The candidate cells may also satisfy the cell selection or cell suitability criterion (e.g., received signal power as measured by the UE). In some embodiments, the candidate cells have the same cell priority that is the highest cell priority of those cells meeting the suitability criterion. From the set of candidate cells, the UE processing circuitry determines a cell to replace the current serving cell for communicating with the network.

Adding the cell priority information resolves the loading problem example of FIG. 3 by allowing the UE1 and UE2 to select under-loaded cells C and B according to cell priority even though frequency priority would restrict selection otherwise. However, this approach may still not resolve all network load balancing issues and in some situations the load balancing may have to be disabled.

Figure 6A:
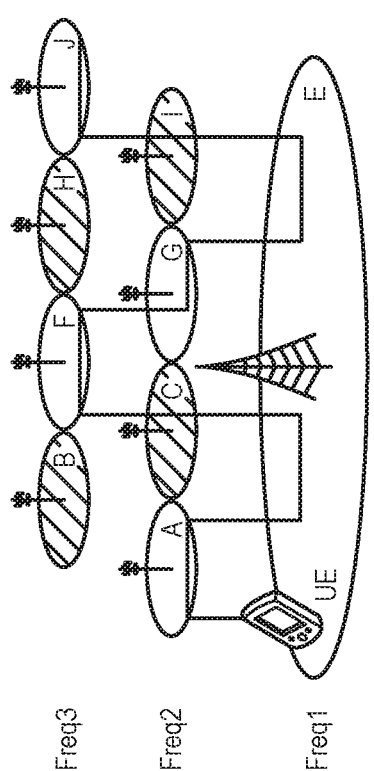
FIGS. 6A and 6B illustrate portions of another example of n communication traffic loading a cellular phone network.
Figure 6B:
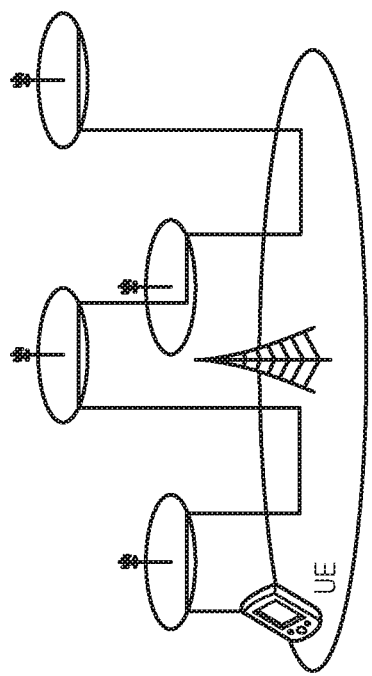

FIGS. 6A and 6B illustrate portions of another example of network traffic loading a cell network. In the example, the network includes a macro cell E assigned carrier Frequency 1. The network includes multiple small cells assigned carrier Frequencies 2 and 3. The small cells are experiencing under-loading or overloading of network traffic. The overloaded small cells are the shaded small cells labeled B, C, G, H, and I. The UE shown in FIGS. 6A and 6B represents a high speed UE. A high speed UE refers to a UE that is physically travelling at a fast speed, such as when the UE is being used in a moving car or other vehicle.

Assume the UE is travelling through the cells and the cells are assigned different priorities to try and balance the network loading. For instance, unshaded small cells A, F, G, and J are assigned a high cell priority because they are experiencing a low amount of traffic, macro cell E is assigned a medium cell priority and the shaded small cells B, C, H, and I are assigned a low cell priority. In the example of FIG. 5A, as the UE moves from left to right through the area of macro cell E, the UE enters the area of small cell A and changes from carrier Frequency 1 of the macro cell to select carrier Frequency 2 of the small cell A because of small cell A's higher priority. When the UE reaches the edge of the area of small cell A, the UE returns to carrier Frequency 1 of macro cell E. The UE does not stay on carrier Frequency 2 because small cell C has lower priority, and the UE does not select carrier Frequency 3 because small cell B also has lower priority.

As the UE enters the area of under-loaded small cell F, the UE selects carrier Frequency 3 assigned to the higher priority small cell. When the UE reaches the end of the area of small cell F, the UE selects carrier Frequency 2 of small cell G because the small cell has higher priority than small cell or macro cell E. When the UE reaches the end of the area of small cell G, the UE is forced back to macro cell E because macro cell E has higher priority than small cells and I. When the UE reaches the area of under-loaded small cell the UE selects carrier Frequency 3. The example of FIG. 6A shows that selecting cells according to cell specific priority may cause the UE to make frequent cell reselections. This may lead to high power consumption by the high speed UE as the UE needs to repeat platform measurements before changing to carrier frequencies of the different cells. The high power consumption may cause the available battery energy of the UE to drain quickly.

The example of FIG. 6B shows macro cell assigned carrier Frequency 1 and small cells assigned carrier Frequencies 2 and 3. The small cells assigned higher cell priority than the macro cell, but deployment of the small cells is not contiguous and there are gaps in the areas served by the small cells. The UE is forced back to macro cell E when the UE reaches the end of the area of a small cell because there is no other cell available. The Figure shows the non-contiguous cell small cell deployment as the UE bounces back and forth between selecting a small cell according to priority and selecting the macro cell due to the lack of cell coverage. As in the example of FIG. 6A, the UE makes frequent cell reselections and this can also lead to high power consumption by the UE.

The examples of FIGS. 6A and 6B show that load balancing using cell specific priority may not be appropriate for high speed UEs. Thus, returning to FIG. 5 at 515, selection of candidate cells using cell specific priority and frequency priority may be disabled when the UE is designated a high speed UE. In certain examples, a UE determines if it is a high speed UE. The UE may determine a cell count to count the number of cells used during its communication with the cell network. The processing circuitry of the UE may designate itself as a high speed UE when the cell count satisfies a cell count threshold within a specified (e.g., programmed) time period. In certain examples, the designation of a UE as a high speed UE may be performed by the network. The UE may communicate the cell count to the network (e.g., the E-UTRAN of FIG. 1) and the network designates the cell according to cell count specified in the E-UTRAN. The network may communicate the high sped UE designation to the UE and the UE disables cell selection using cell specific priority information, or the network may disable the cell selection using cell specific priority information. In certain embodiments, all load balancing algorithm are disabled for high speed UEs.

In addition to the high speed UE problem, there may be other issues not resolved by load balancing with cell specific priority. For instance, adding cell priority to frequency priority may not optimally resolve the overloading problem described in the example of FIG. 4. For instance, if the UE only uses the cell priority and frequency priority information to choose the cell with the highest priority and highest frequency priority, the co-located UEs would all jump to the same cell of highest priority, and the UEs would not be redistributed uniformly.

An approach to resolve the overloading of the example of FIG. 4 is to allow a UE to identify cells as candidate cells if they have a higher cell priority than current serving cell and are assigned a frequency with a priority lower than the current serving frequency. A UE is then permitted to select such a cell to replace the current serving cell under certain conditions. This expands the number of candidate cells and would allow the network to distribute the many co-located UEs in FIG. 4 among cells A, C, and E.

In some embodiments, the UE selects the candidate cell with lower frequency priority to replace the current serving cell when at least one of the following conditions are satisfied: a) the cell specific priority of the current serving is available to the UE and the identified cell has a higher cell specific priority than the current serving cell, or b) the cell specific priority of the current serving cell is unavailable to the UE and the identified cell has a higher cell specific priority than the frequency priority of the current serving frequency. In some embodiments, the UE initiates a selection of a candidate cell with lower frequency priority to replace the current serving cell when more than a specified time has elapsed since the UE device selected the current serving cell (e.g., a reselection timer times out). This timer initiated selection may help distribution of the UEs over available cells by keeping a UE from always reselecting the same cell.

Cell reselection to a cell having a higher frequency priority may take precedent over reselection to a cell with lower frequency priority when there are multiple cells with different cell specific priorities higher than the current cell specific priority and these multiple cells meet the suitability criterion of reselection. A situation may arise where multiple candidate cells are identified that have equal cell specific priority and that priority is the highest of the cell specific priorities and frequency priorities. When this cell specific priority is also higher than the cell priority of the current serving cell and the multiple candidate cells satisfy the specified cell suitability criterion, then the candidate cell to replace the current serving cell can be randomly selected from these identified multiple candidate cells. For the situation where there are multiple candidate cells with frequency priority equal to the priority of the current serving frequency, cell reselection may be based on intra-frequency cell reselection (e.g., a cell ranking based on suitability measurements).

According to some embodiments, the system information received by the processing circuitry of a UE includes an indication that a hash algorithm is used to select a carrier frequency to replace the current serving frequency. The hash algorithm may be applied to all carrier frequencies to randomly select the next current serving carrier frequency. This is useful to resolve the overloading of the example in FIG. 4 because the randomized behavior allows the network to distribute the communication of the co-located UEs among the available carrier frequencies. However, this application of the hash algorithm is not ideal to resolve the under-loading problem of the example of FIG. 3 because the network is not able to prioritize the under-loaded cells. When cell specific priority information is included in the system information, the processing circuitry of the UE may apply the hash algorithm to the cells with higher cell specific priority than the current serving cell, and select the next serving cell according to the hash algorithm.

In some embodiments, a cell identifier list or cell ID list may be included in the system information. The cell identifier list may include the cells designated as small cells. If a cell identifier list is included in the system information, the UE may perform measurements to identify candidate cells as those cells which satisfy the suitability criterion. The UE may then use the hash algorithm to select a cell to replace the current serving cell from among the candidate cells that satisfies the suitability criterion. In certain embodiments, the cell identifier list identifies carrier frequencies of the small cells instead of the small cells themselves. The UE applies the hash algorithm to the cell identifier list to select a current serving carrier frequency. The hash algorithm is applied to all carrier frequencies as described previously if a cell identifier list is unavailable.

According to some embodiments, the system information received by the processing circuitry of a UE includes an indication that probability is used to select a carrier frequency to replace the current serving carrier frequency. The system information may include a first frequency probability assigned to a carrier frequency of a first cell designated as a small cell and a second different frequency probability assigned to a carrier frequency of a second cell designated as a small cell. If different probabilities were not established for the small cells, the network would not be able to prioritize the small cells, such as to move traffic to under-loaded small cells for example.

Figure 7:
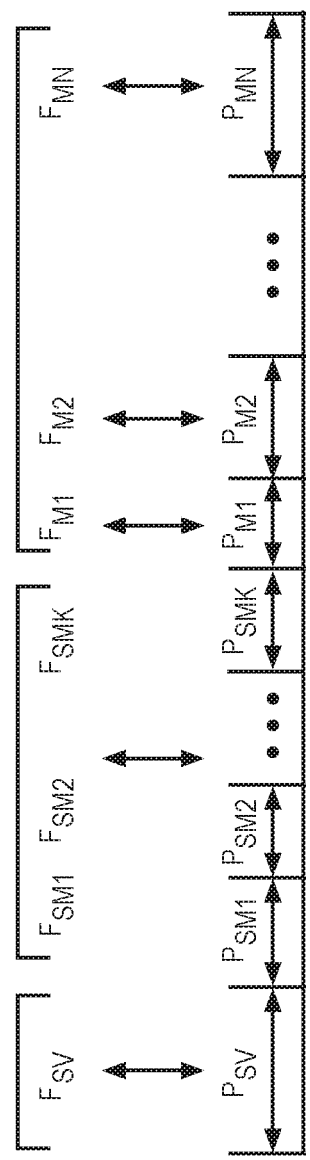
FIG. 7 shows an example of assigning probabilities to cells of an end-to-end communication network in accordance with some embodiments.

FIG. 7 shows an example of assigning probabilities to cells. Probabilities (Pm1, Pm2, . . . Pmn) are assigned to carrier frequencies (Fm1, Fm1, . . . Fmn), respectively, of cells designated as macro cells. The probabilities can be referred to as probability bins. Multiple probabilities (Psm1, Psm2, . . . Psmk) are assigned the carrier frequencies of groups of cells designated as small cells. The grouping may be included in a small cell identifier list. The small cell identifiers in the list can include physical cell identifiers (PCIs) or global cell identifiers. In some variations, the small cell identifier list assigns a probability to a group of small cells. FIG. 7 shows the example where the group size is "1"

or "1 cell" and each small cell is assigned a probability. The processing circuitry of the UE may select a carrier frequency to replace the current serving carrier frequency using a UE generated random number (e.g., a random number uniformly distributed between 0 and 1) and the received frequency probability information. The ability to assign different probabilities to different groups of small cells or to different small cells provides a way for the network to prioritize the use of under-loaded or under-utilized cells.

The several examples described herein balance network communication traffic to reduce latency in a radio access network or reduce interruption in service. The network performs network load balancing to take advantage of under-utilized cells or by distributing UE communication uniformly over available cells.

ADDITIONAL NOTES AND EXAMPLES

Example 1 can include subject matter (such as a UE) comprising physical layer circuitry configured to transmit and receive radio frequency electrical signals with one or more nodes of a radio access network; and processing circuitry configured to: receive system information via the network, wherein the system information indicates cell specific priority and frequency priority; identify candidate cells that have a cell specific priority that is higher than a cell priority of the current serving cell, have a frequency priority that is higher than a frequency priority of a current serving frequency, and satisfy a cell suitability criterion; and determine a candidate cell from the identified candidate cells to replace the current serving cell for communicating with the network.

In Example 2, the subject matter of Example 1 can optionally include processing circuitry configured to identify a cell having lower frequency priority than priority of the current serving frequency as a candidate cell, and replace the current serving cell with the identified cell of lower frequency priority when the identified cell has a higher cell specific priority than the current serving cell.

In Example 3, the subject matter of one or both of Examples 1 and 2 optionally includes processing circuitry configured to identify a cell having lower frequency priority than priority of the current serving carrier frequency as a candidate cell, and replace the current serving cell with the identified cell of lower frequency priority when the cell specific priority of the current serving cell is unavailable to the UE and the identified cell has a higher cell specific priority than the frequency priority of the current serving cell.

In Example 4, the subject matter of one or any combination of Examples 1-3 optionally includes processing circuitry configured to select the candidate cell according to an intra-frequency cell reselection criterion when a frequency priority of the candidate cells is equal to the frequency priority of the current serving carrier frequency.

In Example 5, the subject matter of one or any combination of Examples 1-4 optionally include processing circuitry is configured to: identify multiple candidate cells that have a same cell specific priority that is higher than the cell priority of the current serving cell and satisfy the specified cell suitability criterion; and randomly select a candidate cell from the identified multiple candidate cells to replace the current serving cell.

In Example 6, the subject matter or one or any combination of Examples 1-5 optionally includes processing circuitry that disables LIE selection of a candidate cell using cell specific priority and frequency priority when the UE is identified as a high speed UE.

In Example 7, the subject matter of one or any combination of Examples 1-6 optionally includes processing circuitry configured to: receive frequency selection probability information including a first frequency probability assigned to a carrier frequency of a first cell designated as a small cell and a second different frequency probability assigned to a carrier frequency of a second cell designated as a small cell; and select a carrier frequency to replace the current serving carrier frequency using a UE generated random number and the received frequency probability information.

In Example 8, the subject matter of Example 7 optionally includes the frequency selection probability information having multiple frequency probabilities, including at least one frequency probability assigned to the carrier frequency of a cell designated as a macro cell and multiple frequency probabilities assigned to carrier frequencies of cells designated as small cells.

In Example 9, the subject matter of one or any combination of Examples 1-8 optionally includes processing circuitry is configured to: receive an indication that a hash algorithm is used to select a carrier frequency to replace the current serving frequency; select a carrier frequency from the carrier frequencies of cells included in a cell identifier list according to the hash algorithm when the cell identifier list is included in the system information; and select a carrier frequency from all available carrier frequencies of the candidate cells according to the hash algorithm when the cell identifier list is unavailable to the UE.

In Example 10, the subject matter of one or any combination of Examples 1-9 optionally includes the system information received by the processing circuitry including a cell identifier list and an indication that a hash algorithm is used to select a cell as the serving cell, wherein the processing circuitry is configured to: identify the candidate cells using the cell identifier list; and select a cell from the identified candidate cells to replace the current serving cell according to the hash algorithm.

In Example 11, the subject matter of Example 10 optionally includes a cell identifier list that includes cells designated as small cells.

In Example 12, the subject matter of one or any combination of Examples 1-11 optionally includes one or more antennas electrically coupled to the physical layer circuitry.

Example 13 can include subject matter, or can optionally be combined with the subject matter of one or any combination of Examples 1-12 to include such subject matter, such as a computer readable storage medium to store instructions for execution by one or more processors of user equipment (UE) to perform operations to configure the UE to: receive system information via the network, wherein the system information indicates cell specific priority and frequency priority; identify candidate cells, to replace a current serving cell, that have a cell specific priority that is higher than the cell priority of a current serving cell, have a frequency priority that is higher than a frequency priority of a current serving carrier frequency, and satisfy a cell suitability criterion; and determine a candidate cell from the identified candidate cells to replace the current serving cell for communicating with the network.

In Example 14, the subject matter of Example 13 can optionally include instructions to perform operations to configure the UE to: identify a cell having lower frequency priority than priority of the current serving carrier frequency as a candidate cell; and select the candidate cell to replace the current serving cell when at least one of the identified cell has a higher cell specific priority than the current serving cell, or the cell specific priority of the current serving cell is unavailable to the UE and the identified cell has a higher cell specific priority than the frequency priority of the current serving frequency.

In Example 15, the subject matter of one or both of Examples 13 and 14 optionally include instructions to perform operations to configure the UE to: receive a cell identifier list and an indication that a hash algorithm is used to select a cell to replace the serving cell; identify the candidate cells using the cell identifier list; and detect a cell from the identified candidate cell to replace the current serving cell according to the hash algorithm.

Example 16 can include subject matter (such as a method, a means for performing acts, or a machine-readable medium including instructions that, when performed by the machine, cause the machine to perform acts), or can optionally be combined with the subject matter of one or any combination of Examples 1-12 to include such subject matter, such as a comprising: receiving system information via the network, wherein the system information indicates cell specific priority and frequency priority; identifying candidate cells, to replace a current serving cell, that have a cell specific priority that is higher than the cell priority of a current serving cell, have a frequency priority that is higher than a frequency priority of a current serving carrier frequency, and satisfy a cell suitability criterion; and disabling selection of candidate cells using cell specific priority and frequency priority when the UE is designated a high speed UE.

In Example 17, the subject matter of Example 16 can optionally include identifying a cell having lower frequency priority than priority of the current serving carrier frequency as a candidate cell; and selecting the candidate cell to replace the current serving cell when at least one of the identified cell has a higher cell specific priority than the current serving cell, or the cell specific priority of the current serving cell is unavailable to the UE and the identified cell has a higher cell specific priority than the frequency priority of the current serving frequency.

In Example 18, the subject matter of one or both of Examples 16 and 17 optionally includes identifying multiple candidate cells that have a same cell specific priority that is higher than the cell priority of the current serving cell and that satisfy the specified cell suitability criterion, and wherein selecting the candidate cell includes randomly selecting the candidate cell from the identified multiple candidate cells.

In Example 19, the subject matter of one or any combination of Examples 16-18 optionally includes system information that includes frequency selection probability information including a first frequency probability assigned to a carrier frequency of a first cell designated as a small cell, and a second different frequency probability assigned to a carrier frequency of a second cell designated as a small cell; and wherein selecting a candidate cell includes selecting a carrier frequency using a UE generated random number and the received frequency probability information.

In Example 20, the subject matter of Example 19 optionally includes frequency selection probability information that includes multiple frequency probabilities including at least one frequency probability assigned to the carrier frequency of a cell designated as a macro cell and multiple frequency probabilities assigned to carrier frequencies of cells designated as small cells.

In Example 21, the subject matter of one or any combination of Examples 16-20 optionally includes system information that includes an indication that a hash algorithm is used to select a carrier frequency, and wherein selecting a candidate cell includes: selecting a carrier frequency from the carrier frequencies of cells included in a cell identifier list according to the hash algorithm when the cell identifier list is included in the system information; and selecting a carrier frequency from all available carrier frequencies of the candidate cells according to the hash algorithm when the cell identifier list is unavailable to the UE.

In Example 22, the subject matter of one or any combination of Examples 16-21 optionally includes system information that includes a cell identifier list and an indication that a hash algorithm is used to select a cell as the serving cell, wherein the candidate cells are identified using the cell identifier list and wherein selecting a candidate cell includes identifying a cell from the identified candidate cells according to the hash algorithm.

Example 23 can include subject matter, or can optionally be combined with the subject matter of one or any combination of Examples 1-22 to include such subject matter, such as a UE device of an end-to-end communication network comprising: means for receiving system information via the network, wherein the system information indicates cell specific priority and frequency priority; means for identifying candidate cells, to replace a current serving cell, that have a cell specific priority that is higher than the cell priority of a current serving cell, have a frequency priority that is higher than a frequency priority of a current serving carrier frequency, and satisfy a cell suitability criterion; and means for disabling selection of candidate cells using cell specific priority and frequency priority when the UE is designated a high speed UE In Example 24, the subject matter of Example 25 can optionally include means for identifying a cell having lower frequency priority than priority of the current serving carrier frequency as a candidate cell; and means for selecting the candidate cell to replace the current serving cell when at least one of the identified cell has a higher cell specific priority than the current serving cell, or the cell specific priority of the current serving cell is unavailable to the UE and the identified cell has a higher cell specific priority than the frequency priority of the current serving frequency.

In Example 25, the subject matter of one or both of Examples 23 and 24 optionally includes means for receiving an indication that a hash algorithm is used to select a carrier frequency, and wherein the UE device further includes: means for selecting a carrier frequency from the carrier frequencies of cells included in a cell identifier list according to the hash algorithm when the cell identifier list is included in the system information; and means for selecting a carrier frequency from all available carrier frequencies of the candidate cells according to the hash algorithm when the cell identifier list is unavailable to the UE.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. Apparatus of user equipment (UE) that is redistribution capable and configured for selection of a redistribution target from candidate cells and candidate channel frequencies, the apparatus comprising:
processing circuitry; and
memory,
the processing circuitry configured to:
decode a system information block received via a radio access network, wherein the system information block identifies one or both of target cells and target channel frequencies;
determine a sorted list of candidate redistribution targets, the sorted list including:
candidate cells for a serving cell when a serving cell redistribution priority is included in the system information and candidate cells for a serving frequency otherwise when the serving cell redistribution priority is unavailable in the system information; and
an additional candidate for each target channel frequency included in the system information,
wherein the additional candidate for a target channel frequency is set to a target cell ranked highest on the target channel frequency according to signal quality if the target cell meets a selection criterion;
determine a redistribution priority for candidates in the sorted list, wherein the redistribution priority for a candidate includes a cell redistribution priority received in the system information if the candidate includes a target cell, and a frequency redistribution priority received in the system information if the candidate includes a target channel frequency; and
select a redistribution target from the candidate redistribution targets using the determined redistribution priorities; and
the memory configured to store the sorted list of candidate redistribution targets.

2. The apparatus of claim 1, wherein the processing circuitry is configured to initiate selecting the redistribution target upon expiration of a timer.

3. The apparatus of claim 1, wherein the processing circuitry is configured to include candidate redistribution targets in the sorted list that fulfill a cell selection criterion.

4. The apparatus of claim 3, wherein the processing circuitry is configured to include candidate redistribution targets in the sorted list that fulfill a specified receive signal power level criterion.

5. The apparatus of claim 1, wherein the processing circuitry is configured to select a redistribution target with a lower priority frequency than the serving cell when the redistribution target fulfills a signal power selection criterion.

6. The apparatus of claim 1, wherein the processing circuitry is configured to calculate a probability value for the candidates in the sorted list and select the redistribution target from the candidate redistribution targets using the determined redistribution priorities and the calculated probability values.

7. The apparatus of claim 1, wherein the processing circuitry is configured to select the redistribution target from the candidate redistribution targets using the redistribution priority and a random number generated using the UE.

8. The apparatus of claim 1, wherein the processing circuitry is configured to determine a candidate cell from the identified target cells to replace the current serving cell for communicating with the network using the redistribution priorities, and disable selection of a candidate cell when the UE is identified as a high speed UE.

9. A non-transitory computer-readable storage medium that stores instructions for execution by one or more processors of user equipment (UE) to perform operations to configure the UE to:
decode a system information block received via a radio access network, wherein the system information block identifies one or both of target cells and target channel frequencies;
determine a sorted list of candidate redistribution targets, the sorted list compiled to include:
candidate cells for a serving cell when a serving cell redistribution priority is included in the system information and the candidate cells for a serving frequency when the serving cell redistribution priority is unavailable in the system information; and
an additional candidate for each target channel frequency included in the system information,
wherein the additional candidate for a target channel frequency is set to a target cell ranked as the best cell on the target channel frequency according to signal quality if the target cell meets a suitability criterion;
determine a redistribution priority for candidates in the sorted list, wherein the redistribution priority for a candidate includes a cell redistribution priority received in the system information if the candidate includes a target cell, and a frequency redistribution priority received in the system information if the candidate includes a target channel frequency; and select a redistribution target from the candidate redistribution targets using the determined redistribution priorities.

10. The computer-readable storage medium of claim 9, including instructions that cause the one or more processors to perform operations to configure the UE to initiate selecting the redistribution target upon expiration of a timer.

11. The computer-readable storage medium of claim 9, including instructions that cause the one or more processors to perform operations to configure the UE to compile the sorted list to include candidate redistribution targets that fulfill a cell selection criterion.

12. The computer-readable storage medium of claim 9, including instructions that cause the one or more processors to perform operations to configure the UE to compile the sorted list to include candidate redistribution targets that fulfill a specified receive signal power level criterion.

13. The computer-readable storage medium of claim 9, including instructions that cause the one or more processors to perform operations to configure the UE to select a redistribution target with a lower priority frequency than the serving cell as a candidate cell when the redistribution target fulfills a signal power selection criterion.

14. The computer-readable storage medium of claim 9, including instructions that cause the one or more processors to perform operations to configure the UE to calculate a probability value for the candidates in the sorted list and select the redistribution target from the candidate redistribution targets using the determined redistribution priorities and the calculated probability values.

15. The computer-readable storage medium of claim 9, including instructions that cause the one or more processors to perform operations to configure the UE to select the redistribution target from the candidate redistribution targets using the redistribution priority and a random number generated using the UE.

* * * * *